(12) United States Patent
Jeanne et al.

(10) Patent No.: US 12,481,973 B2
(45) Date of Patent: Nov. 25, 2025

(54) METHOD AND DEVICE FOR MANAGING ACCESS AUTHORIZATION TO A PAYMENT SERVICE PROVIDED TO A USER

(71) Applicant: Orange, Issy-les-Moulineaux (FR)

(72) Inventors: Fabrice Jeanne, Chatillon (FR); Baptiste François Hemery, Chatillon (FR); Sandrine Le Calvez, Chatillon (FR); Romain Trinquart, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 17/786,492

(22) PCT Filed: Nov. 26, 2020

(86) PCT No.: PCT/FR2020/052177
§ 371 (c)(1),
(2) Date: Jun. 16, 2022

(87) PCT Pub. No.: WO2021/123527
PCT Pub. Date: Jun. 24, 2021

(65) Prior Publication Data
US 2023/0009823 A1    Jan. 12, 2023

(30) Foreign Application Priority Data
Dec. 19, 2019    (FR) ...................... 1914842

(51) Int. Cl.
*G06Q 20/22* (2012.01)
*G06Q 20/38* (2012.01)
(Continued)

(52) U.S. Cl.
CPC ....... *G06Q 20/229* (2020.05); *G06Q 20/3829* (2013.01); *G06Q 20/4014* (2013.01); *G06Q 20/42* (2013.01); *G06Q 2220/00* (2013.01)

(58) Field of Classification Search
CPC ............ G06Q 20/229; G06Q 20/3829; G06Q 20/4014; G06Q 20/42; G06Q 2220/00
See application file for complete search history.

(56) References Cited

U.S. PATENT DOCUMENTS 8,769,642 B1 * 7/2014 O'Neill ............... H04L 63/0807
726/28
9,466,051 B1 10/2016 Roth et al.
(Continued)

FOREIGN PATENT DOCUMENTS

| EP | 2208336 A0 | 7/2010 |
| EP | 2208336 B1 | 3/2018 |
| WO | WO 2009/027082 A1 | 3/2009 |

OTHER PUBLICATIONS

O. Bamasak, et al., DiSigncryption: An Integration of Agent-Based Signature Delegation with Distributed Reputation Management Scheme, Apr. 18, 2005, IEEE, pp. 1-8 (Year: 2005).*
(Continued)

*Primary Examiner* — Nilesh B Khatri
(74) *Attorney, Agent, or Firm* — Knobbe, Martens, Olson & Bear, LLP

(57) ABSTRACT

A method and a device for managing access authorization to a payment service provided to a user is disclosed. A request to initialize at least one access authorization is received from a terminal of the owner user. Such an access authorization is intended to allow at least one delegated user to access the account of the owner user, the request comprising at least one identifier of the delegated user and one identifier of the owner user. Temporary data for accessing an account associated with the delegated user is generated, the temporary data comprising a public identifier associated with the delegated user, and a confidential code associated with the
(Continued)

public identifier. The temporary data is transmitted to at least one terminal of the delegated user or of another user.

9 Claims, 6 Drawing Sheets

(51) Int. Cl.
 *G06Q 20/40* (2012.01)
 *G06Q 20/42* (2012.01)

(56) References Cited

U.S. PATENT DOCUMENTS

| | | | |
|---|---|---|---|
| 10,909,518 B2* | 2/2021 | Mardikar | G06Q 20/202 |
| 10,924,284 B2* | 2/2021 | Yang | G06F 16/2379 |
| 11,257,085 B1* | 2/2022 | Barkas | G06Q 20/3829 |
| 11,551,200 B1* | 1/2023 | Cook | H04B 5/72 |
| 2002/0174048 A1 | 11/2002 | Dheer et al. | |
| 2004/0015702 A1* | 1/2004 | Mercredi | G06F 21/32 713/182 |
| 2008/0110982 A1* | 5/2008 | Song | G06Q 40/02 235/380 |
| 2009/0198617 A1* | 8/2009 | Soghoian | G06Q 20/04 705/65 |
| 2010/0319068 A1* | 12/2010 | Abbadessa | H04L 63/08 726/21 |
| 2012/0330784 A1* | 12/2012 | Nahidipour | G06Q 20/20 705/26.1 |
| 2014/0258010 A1* | 9/2014 | Mardikar | G06Q 20/202 705/21 |
| 2014/0310769 A1* | 10/2014 | O'Neill | H04L 63/10 726/1 |
| 2015/0288669 A1* | 10/2015 | Litoiu | G06F 16/9535 726/4 |
| 2016/0092869 A1* | 3/2016 | Salama | G06Q 20/326 705/41 |
| 2017/0357977 A1* | 12/2017 | Pitz | G06Q 20/4016 |
| 2019/0370802 A1* | 12/2019 | Bennett | G06Q 20/16 |
| 2020/0044838 A1* | 2/2020 | Yoo | G06F 21/62 |

OTHER PUBLICATIONS

International Search Report for International Application No. PCT/FR2020/052177, dated Mar. 11, 2022.

* cited by examiner

METHOD AND DEVICE FOR MANAGING ACCESS AUTHORIZATION TO A PAYMENT SERVICE PROVIDED TO A USER

CROSS-REFERENCE TO RELATED APPLICATIONS

This application is filed under 35 U.S.C. § 371 as the U.S. National Phase of Application No. PCT/FR2020/052177 entitled "METHOD AND DEVICE FOR MANAGING ACCESS AUTHORISATION TO A PAYMENT SERVICE PROVIDED TO A USER" and filed Nov. 26, 2020, and which claims priority to FR 1914842 filed Dec. 19, 2019, each of which is incorporated by reference in its entirety.

BACKGROUND

Field

The development lies in the field of technologies used for implementing payment services, and in particular services related to digital money, mobile payment and prepaid payment, by card or not. The development relates more particularly to the management of access authorisation of a third party to such a payment system associated with an owner user, to carry out payment transactions.

Description of the Related Technology

There are currently various types of payment services allowing users to carry out transactions via a payment service to which they previously became authenticated, for example by creating an account with the payment service.

Such payment services include, but are not limited to:
a mobile payment service,
a card payment service,
a digital money service,
a prepaid account payment service,
an online payment and/or money transfer service system.

Such payment services can be associated with a bank account of the user, or based on a prepaid account, or associated with a payment method associated with a bank account of the user (for example, a card, or an account of a service provider, for example, a mobile communications operator).

In most of these payment services, the providers of these payment services require that, prior to the completion of a payment transaction ordered by the user authenticated to the payment service, the balance of the user's account with the payment service is not negative or that a payment method associated with a bank account of the user is associated with the user's payment service account. In other words, the user must either transfer money to their payment service account or associate a payment method associated with a bank account in order to be able to carry out a payment transaction via the payment service account.

The above-mentioned payment service types allow for one-time payment transactions. However, the operating mode of these payment services is not adapted to the implementation of other services such as direct debit, deposit, credit . . . because it is not possible to anticipate an account balance of a user of such a payment service, at a fixed date in the future. Indeed, the account could no longer have funds or even be closed.

The use of this type of payment service by users therefore poses a problem of trust of the third parties in these users. It should also be noted that in order to meet current regulatory constraints, a user identity associated with a payment service account is unique. In addition, for obvious security reasons, it is not recommended to transfer the identifier of a payment service account or the authentication data of a user of the payment service to third parties so that they can carry out transactions via that account.

There is therefore a need to improve the technique to offer more services to the users of these types of payment services.

SUMMARY

The development improves the state of the art. For this purpose, it relates to a method for managing access authorisation to a payment service provided to a used, referred to as owner user. The method is implemented by a processor of a management device, and:
  receiving, from a terminal of said owner user, a request to initialise at least one access authorisation, said access authorisation being intended to allow at least one delegated user to access said payment service provided to said owner user, said request comprising at least one identifier of said delegated user and one identifier of said owner user,
  generating temporary data for accessing the payment service, associated with said delegated user, said temporary data comprising a public identifier associated with said delegated user, and a confidential code associated with said public identifier,
  transmitting said temporary data to at least one terminal of the delegated user or of another user.

The development thus allows an owner user to assign to one or more delegated users access authorisation to a payment service that is provided to them. The owner user of the payment service is a user having authentication data that allows them to authenticate to the payment service provider and access the payment service. For example, the payment service can be a mobile payment service based on a prepaid account, or an online payment service associated with a payment method of the owner user, such as a bank card, or associated with an account authenticated to a service provider, such as a communication network operator.

The development broadens for the users of payment services, in particular mobile or online, and the people around them, the range of services offered by this type of payment services while ensuring identification constraints required with regards to the current regulation, the control of the transactions carried out and an increased level of security.

Thanks to the development, the owner user can delegate access rights to the payment service to which they are authenticated so that delegated users can carry out payment transactions. The security of the owner user's authentication data is ensured, because they do not provide their identifier and secret code to third parties. A user who has been delegated access to the payment service of the owner user has temporary access data (identifier and code) generated and provided by the management device and associated with this delegated user.

The temporary access data is transmitted to the delegated user, or to another recipient user, if the delegated user is not the originator of the payment transactions to be carried out via the payment service provided to the owner user.

When the payment service operates in conjunction with an account created for the owner user, for example a prepaid account, the access method defined above allows the delegation of access rights to the account of the owner user.

According to a particular embodiment of the development, the request further comprises an indication of an access authorisation type and at least one parameter associated with said access authorisation type. According to this particular embodiment of the development, the owner user grants access to a payment service that is provided to them or to their account for a given type of authorisation. For example, access can be granted for one type of transaction only, such as a direct debit authorisation, a joint and several guarantee.

In addition, the type of authorisation is associated with parameters allowing the management device or a server to control the use of the payment service or the account by the delegated user. For example, such parameters are the authorised amount, the periodicity of a payment, a validity period of the authorisation.

According to another particular embodiment of the development, the management method further comprises, prior to transmitting said temporary data:

sending to the user's terminal a request to confirm the initialisation request, receiving from the owner user's terminal a confirmation message comprising a confidential code of said owner user for accessing said payment service.

According to this particular embodiment of the development, the owner user confirms the creation of the access authorisation by sending their confidential code. The management device can thus verify the authenticity of the request to initialise an access authorisation received.

According to another particular embodiment of the development, generating temporary data comprises:

encoding said identifier of the owner user with an encryption key specific to the management device to form said public identifier associated with the delegated user, encoding said confidential code of the owner user using said encryption key to form said confidential code associated with the public identifier associated with the delegated user, storing said public identifier associated with the delegated user and a key index identifying said encryption key.

According to this particular embodiment of the development, the public identifier is generated from the identifier of the owner user and an encryption key. The same key is also used to generate the confidential code associated with the generated public identifier. Advantageously, the generated confidential code is not stored by the management device. This confidential code is transmitted to the delegated user. When the delegated user or another recipient user accesses the payment service of the owner user, the management device or a server can decode a received confidential code using the encryption key and verify if the delegated user or the other user is authorised to access the payment service of the owner user.

According to another particular embodiment of the development, the management method comprises beforehand:

receiving, from a terminal of said delegated user, a request to initialise an access authorisation to the payment service provided to the owner user, the request comprising the identifier of said delegated user, the identifier of said owner user and a payment transaction amount, sending to the terminal of the owner user a message informing the owner user of the request to initialise an access authorisation sent by the terminal of the delegated user, the message comprising the identifier of said delegated user and a payment transaction amount.

According to this particular embodiment of the development, the delegated user is at the origin of the request to initialise access authorisation.

For example, this particular embodiment of the development is of interest in the case where the delegated user wishes the owner user to act as guarantor for them. As a variant, the delegated user can ask several first users to act as guarantors for them. In this case, the delegated user sends as many requests to initialise an access authorisation as there are users to whom they wish to ask to act as guarantors for them.

According to another particular embodiment of the development, when the management device receives at least one other request to initialise at least one access authorisation, from a terminal of another owner user, and intended to allow said delegated user to access said payment service of said other owner user, said request comprising at least the identifier of said delegated user and one identifier of said other owner user, the method further comprises:

storing an aggregated account comprising, for each owner user, the public identifier generated from the identifier of said owner user and associated with said delegated user, the key index used to generate the confidential code associated with the public identifier associated with the delegated user from the confidential code of the owner user.

This particular embodiment of the development enables the creation of an aggregated account for the delegated user from several payment services or accounts of owner users who have authorised them to access the payment service provided to them respectively.

According to another particular embodiment of the development, the management method further comprises:

receiving, from a terminal of a recipient user, a payment execution request comprising the public identifier associated with the delegated user, the confidential code associated with said public identifier and a payment amount, decoding the identifier of the owner user and the confidential code of the owner user, from the stored key index, the public identifier associated with the delegated user, and the confidential code associated with said public identifier associated with the delegated user, transmitting an execution order for paying the amount to the recipient user, via the payment service provided to the owner user, based on the decoded identifier of the owner user and confidential code of the owner user.

The development also relates to a device for managing access authorisation to a payment service provided to an owner user, comprising a memory and a processor configured to:

receive, from a terminal of said owner user, a request to initialise at least one access authorisation, said access authorisation being intended to allow at least one delegated user to access said payment service provided to said owner user, said request comprising at least one identifier of said delegated user and one identifier of said owner user, generate temporary data for accessing the payment service, associated with said delegated user, said temporary data comprising a public identifier associated with said delegated user, and a confidential code associated with said public identifier, transmit said temporary data to at least one terminal of the delegated user or of another user.

According to a particular embodiment of the development, the above-mentioned management device is comprised in a server.

The development also relates to a computer program comprising instructions for implementing the management method above according to any one of the particular embodiments described previously, when said program is executed by a processor. The management method can be implemented in various ways, notably in wired form or in software form.

This program can use any programming language, and can be in the form of source code, object code, or intermediate code between source code and object code, such as in a partially compiled form, or in any other desirable form.

The development also relates to a computer-readable storage medium or data medium comprising instructions of a computer program as mentioned above. The recording media mentioned above can be any entity or device able to store the program. For example, the medium can comprise a storage means such as a memory. On the other hand, the recording media can correspond to a transmissible medium such as an electrical or optical signal, that can be carried via an electrical or optical cable, by radio or by other means. The programs according to the development can be downloaded in particular on an Internet-type network.

Alternatively, the recording media can correspond to an integrated circuit in which the program is embedded, the circuit being adapted to execute or to be used in the execution of the management method in question.

BRIEF DESCRIPTION OF THE DRAWINGS

Other characteristics and advantages of the development will emerge more clearly upon reading the following description of particular embodiments, provided as simple non-restrictive illustrative examples, and the annexed drawings, wherein.

DETAILED DESCRIPTION OF CERTAIN ILLUSTRATIVE EMBODIMENTS

The development proposes a method for managing access authorisations to a payment service provided to a user, hereinafter also referred to as the owner user, so that third parties (delegated users, recipient users) can carry out payment transactions via the payment service provided to the owner user.

In particular, the development broadens the range of services offered to payment system users, and in particular to payment systems based on a prepaid account, ensuring identification constraints, a transaction control and a level of security equivalent to those of conventional banking transaction mechanisms.

The management method described below provides a secure mechanism for setting up a delegation of access rights to a payment service used by an owner user, allowing third parties to carry out transactions using the payment service provided to the owner user while respecting certain constraints and using an identifier and a secret code different from those of the owner user. The mechanism is thus secure and the transactions carried out are traceable. In other words, the identity of the third party requesting the transaction is authenticated before the transaction is executed.

When the operation of the payment service is based on the use of an account authenticated to the payment service provider, whether or not it is a prepaid account, the management method described below makes it possible to set up a delegation of access rights to the account of the owner user.

An example of an implementation environment of the development according to a particular embodiment of the development is described below in relation to FIG. 1A.

Figure 1A:
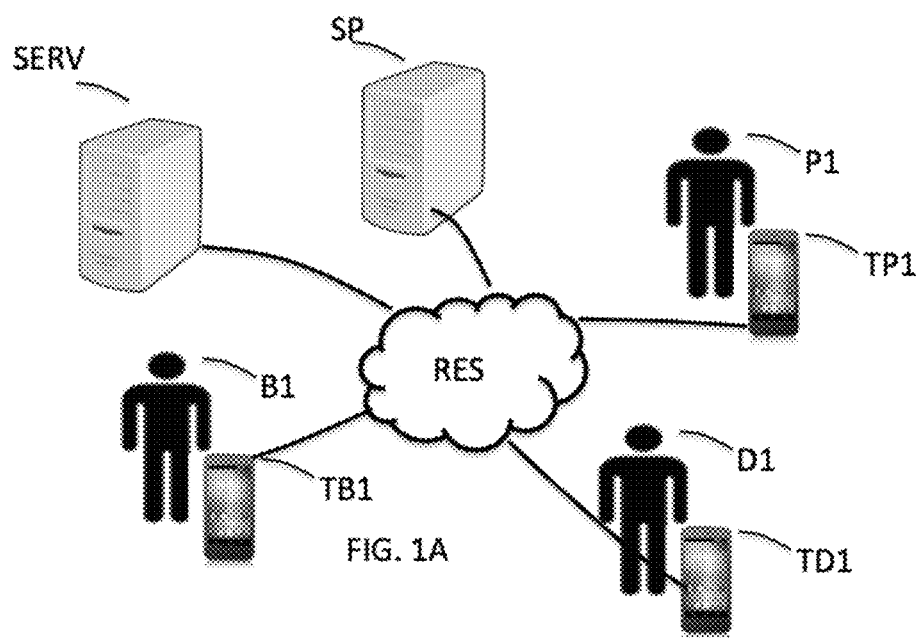
FIG. 1A illustrates an example of an implementation environment of the development according to a particular embodiment of the development.

The environment of FIG. 1A comprises a terminal TP1 of an owner user P1. The owner user P1 has an authenticated access with a payment service provider, for example a mobile payment service. In the particular embodiment described here, the payment service is based on the use of an account created for each owner user with the service provider. For example, a prepaid account.

In another particular embodiment of the development, the payment service can operate without requiring the creation of an account. In this case, an authenticated owner user of the payment service associates with their authentication data with the payment service, a payment method associated with a bank account or with an account of another service provider (for example, a communication operator).

The environment comprises for example one or more payment servers SB of the payment service provider. In particular, the payment server SB receives and executes payment orders and responds to account balance inquiries.

When the payment service is not associated with an account, an account balance inquiry can correspond to an inquiry about a balance availability or a limit allowed by the payment method that was associated with the authentication data of the owner user with the payment service.

According to the development, the owner user, in this case P1, authorises a third party to initiate one or more transactions on their behalf using the payment service provided to the owner user. The environment also comprises a delegated user D1 equipped with a terminal TD1, for example. The delegated user D1 does not necessarily have an authenticated account with the payment service provider. According to the development, this user D1 receives, for example on their terminal TD1, provisional access data to the payment service or to the account of the user P1. Such provisional data notably comprises a public alias and a secret code associated with that public alias. When setting up the access delegation or access authorisation, the delegated user D1 receives the right to initiate one or more transactions via the payment service of the owner user P1.

According to a particular embodiment of the development, the environment also comprises a recipient user B1, equipped with a terminal TB1. The recipient user has authentication data with a payment service provider, which can be the same as or different from the payment service provider with which the owner user P1 has authentication data, and an authenticated account as appropriate. The recipient user B1 is able to receive a payment ordered by the delegated user D1 and paid via the payment service provided to the owner user P1. When the payment service is associated with an authenticated account, this payment is done via the account of the owner user, otherwise via the payment method associated with the authentication data of the owner user.

Under certain conditions, the recipient user B1 can check the creditworthiness of the account of the owner user P1.

In a particular embodiment of the development, the recipient user B1 is identical to the delegated user D1.

The environment also comprises a management device SERV, managed by the payment service provider providing the payment service to the owner user P1. This server SERV sets up the access authorisation to the payment service provided to the owner user P1 by generating and managing public aliases, generating et securing associated secret codes, and managing the specific constraints set for the use of the generated aliases.

In a particular embodiment of the development, the management device SERV is comprised in the server SB of the payment service provider.

The server SERV responds to requests:
  from an owner user: to grant a third party access authorisation to the payment service provided to the owner user, by initialising one (or more) public alias(es) of the identifier of the owner user that can be distributed to the identified delegated users and a provisional secret code associated with the public alias(es),
  from a delegated user: to request the execution of a transaction by providing the received public alias and the associated provisional secret code. The server checks that the conditions of use (thresholds, amount, date, etc.) comply with the conditions set when setting up the access authorisation,
  from a recipient user: when they are different from a delegated user, to request the execution of a payment/ transaction request when due by providing the public alias received.

Access authorisation to the payment service provided to the owner user P1 can be set up via the terminals TP1, TD1 and TB1 of the various users involved, for example via a dedicated application provided by the payment service provider of the owner user P1. Such an application comprises in particular, for the owner, a form for declaring a third party and for entering identification information of delegated users.

According to a variant, during the entry for the initialisation of an access authorisation, the application can allow the owner user to specify a type of delegation, such as direct debit, deposit, payment card . . . , as well as specific use constraints such as a duration, a periodicity, a maximum amount allocated, etc.

The application also comprises, for the recipient or the delegated, one or more forms for entering an alias instead of the common identification (MSISDN, for example) and the secret code associated with this alias, as well as an interface for executing a payment order or a balance inquiry to check an available balance.

The terminals TP1, TB1 and TD1 communicate with the server SERV via a communication network RES.

According to the particular embodiment described here, there are an owner user P1 and a delegated user D1. According to other variants, the owner user P1 can authorise access to their payment service to several delegated users D1, D2 . . . .

Figure 1B:
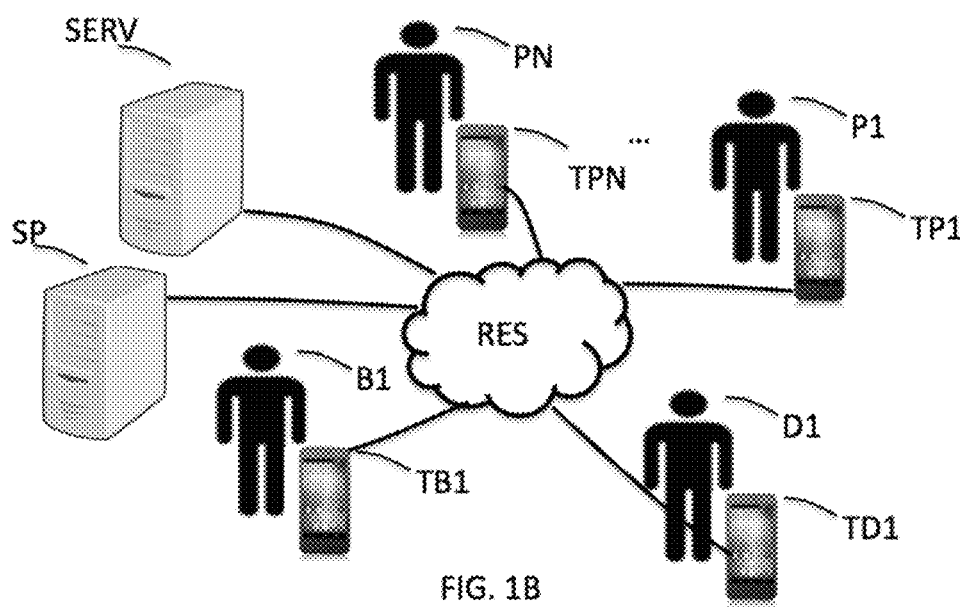
FIG. 1B illustrates an example of an implementation environment of the development according to another particular embodiment of the development.

According to another particular embodiment described, the same delegated user D1 can be authorised by several owner users P1, P2, . . . , PN, to use their payment service. FIG. 1B illustrates an example of an implementation of such a particular embodiment of the development. The environment of FIG. 1B comprises, for example, in addition to the elements already presented in relation to FIG. 1A, a number N of owner users 1 to N respectively equipped with a terminal TPi, i ranging from 1 to N, N being an integer greater than 1. According to this example, the delegated user D1 is authorised to use the payment service or the account of each of the owner users P1, . . . , PN.

According to an embodiment variant, the authorisations received by the delegated user D1 on each of the accounts of the owner users P1, . . . , PN are aggregated into an aggregated account allowing a recipient user B1, for example equipped with a terminal TB1, to request the execution of a transaction on the aggregated account originating from the accounts of the owner users P1, . . . , PN.

Figure 2A:
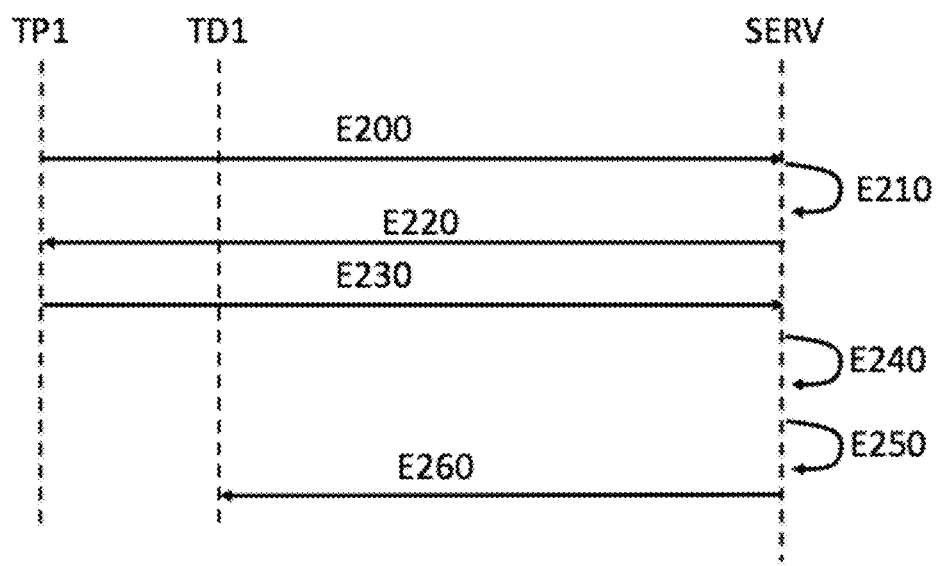
FIG. 2A illustrates steps of the method for managing access authorisation to a payment service provided to a user according to a particular embodiment of the development.

FIG. 2A illustrates steps of the method for managing access authorisation to a payment service provided to a user according to a particular embodiment of the development. The method is described here in the case where the payment service is associated with an account.

In the particular embodiment of the development described here, the owner user P1 requests a direct debit authorisation to be set up for the delegated user D1.

For example, the aim is to authorise a service provider to request the execution of a due payment (invoice) on the account of the owner user P1.

The method described below is, of course, applicable to other types of authorisations.

In a step E200, the owner user P1 sends a request to initialise an access authorisation via their terminal TP1. Such a request comprises in particular an identifier of the delegated user D1 and the identifier of the owner user P1. According to the variant described here, the owner user P1 indicates the type of authorisation requested, here direct debit authorisation, and defines optional parameters associated with the type of authorisation. For example, the owner user P1 specifies a maximum amount per execution request, a periodicity or authorisation of a payment order execution per time unit, a validity period of the authorisation, a maximum amount allocated to the authorisation, etc.

Preferably, the identifier of the delegated user D1 provided is an identifier authenticated to the payment service provider to which the owner user P1 is also authenticated. In other words, the delegated user has an account that is authenticated to this operator.

Upon receiving the request, in a step E210, the server generates temporary data for accessing the account associated with the delegated user D1. In particular, the server generates an alias, also referred to as a public identifier, from the identifier of the owner user P1. This alias is associated with the delegated user D1.

For this purpose, the server encodes the authenticated identifier of the owner user P1 using a server-specific key selected from a list of available keys to produce a public alias in a target format depending on the type of authorisation.

In a step E220, the server sends to the terminal of the owner user P1 a confirmation request for the request to initialise access authorisation.

The owner user P1 confirms their request in a step E230, by sending to the server a confirmation message comprising the confidential code (secret code) of the owner user P1. These exchanges allow the owner user P1 to sign their request to initialise access authorisation.

In a step E240, the server then generates a provisional secret code associated with the alias generated in step E210. For this purpose, the server encodes the secret code of the owner user P1 using the selected key to produce a new secret code of the same size associated with this alias in the form of 4 digits, for example.

For example, the temporary data associated with the delegated user can be in the following format: for the alias: an 8-digit code (in the case of a classic identifier) or a 16-digit code (in the case of an identifier corresponding to a "corporate" card identifier), and for the temporary secret code: 4 digits.

In a step E250, the server then records the data associated with this authorisation:
identifier of the owner user P1,
generated temporary alias (public identifier),
index of the key used for encoding,
use parameters defined by the owner user P1.

Due to security reasons, the server never records in clear text the secret code of the owner user P1, nor the generated temporary secret code, but keeps a way to decrypt them on the fly when executing a transaction from received data (alias+associated temporary secret code).

In a step E260, the server then broadcasts the generated alias, corresponding in this case for a direct debit authorisation to an aggregation of the generated alias and the provisional secret code, to the delegated user D1 and the owner user P1 via the network RES.

As a variant, the public alias is sent by the server, via the network RES, to the owner user P1 who is responsible for transmitting it to the recipient user, via the network RES or any other suitable communication network.

When it is not aggregated to the alias, the temporary secret code generated is sent directly by the server by a secure means to the delegated user.

At the end of the steps described above, the setting up of the access authorisation to the account of the owner user P1 results in the issuance of an authorisation ticket (combination of the alias associated with the delegated user D1 and the temporary secret code) that is not debited from the account of the owner user P1. In other words, the sum is still available to the owner user P1.

Figure 3A:
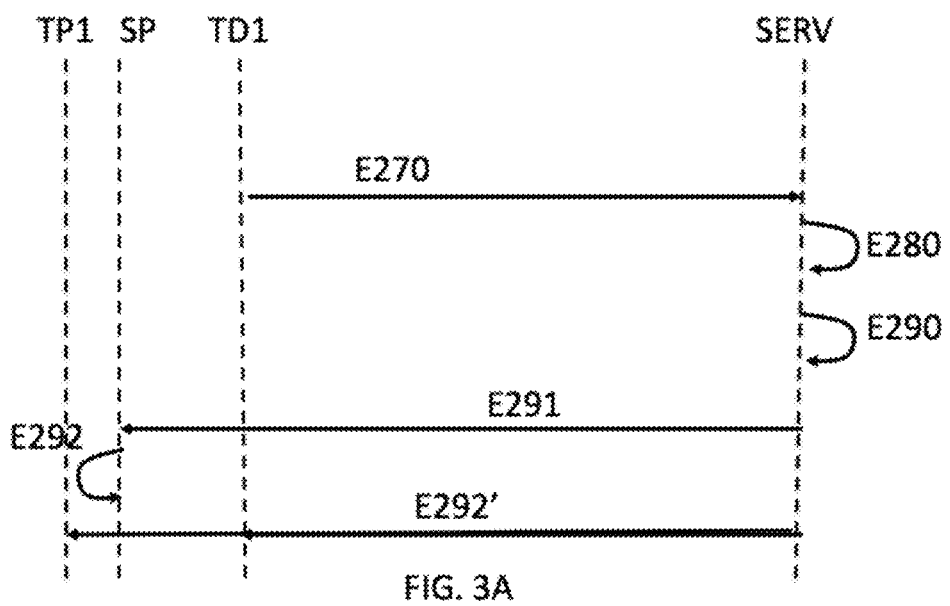
FIG. 3A illustrates other steps of the method for managing access authorisation to a payment service provided to a user according to a particular embodiment of the development.

The use of this authorisation ticket is now described in relation to FIG. 3A. Any request to use this ticket is subject to validation at the time of debit, for example, verifying the available balance, the use criteria, etc.

If the delegated user D1 wants to make a payment on the account of the owner user P1, in a step E270, the delegated user D1 enters their identifiers on the application of their terminal TD1:
the public identifier (alias) received,
the provisional secret code received,
the amount of the payment.

In a step E280, the server obtains the used encryption key from the key index that was stored with the received public identifier. It then obtains the identifier and the secret code of the owner user, by decoding the public identifier and the provisional secret code received from the encryption key obtained.

In a step E290, the server checks the conditions of use associated with the public alias: validity, amount, periodicity of payment, etc.

If the conditions are valid, in a step E291, the server transmits an order for executing the payment of the amount to the delegated user D1, via the account of the owner user P1. For this purpose, the server SERV transfers the payment request to a payment transaction server SB with the decoded secret code and identifier of the owner user P1 and requests that the payment be executed on behalf of the owner user P1 of the account.

In a step E292, the payment transaction server SB transfers the amount from the account of the owner user P1 to the account of the delegated user D1.

According to a particular embodiment of the development, the account owner user is notified and receives a request to validate the transaction (not shown in FIG. 3A).

When the conditions checked in step E290 are not valid, the transaction, in this case a debit, is rejected. In a step E292', the server notifies the delegated user D1 and the owner user P1.

According to a particular embodiment of the development, a recipient/delegated user can check the creditworthiness of an owner user, for example, prior to making a debit request.

The recipient user enters the received temporary data comprising the alias and the provisional secret code.

The server receives this request and extracts the identifier of the owner user and their secret code.

The server requests an account and balance verification on behalf of the owner user and transfers the result in an OK/KO form to the recipient/delegated user, via the network RES.

Figure 2B:
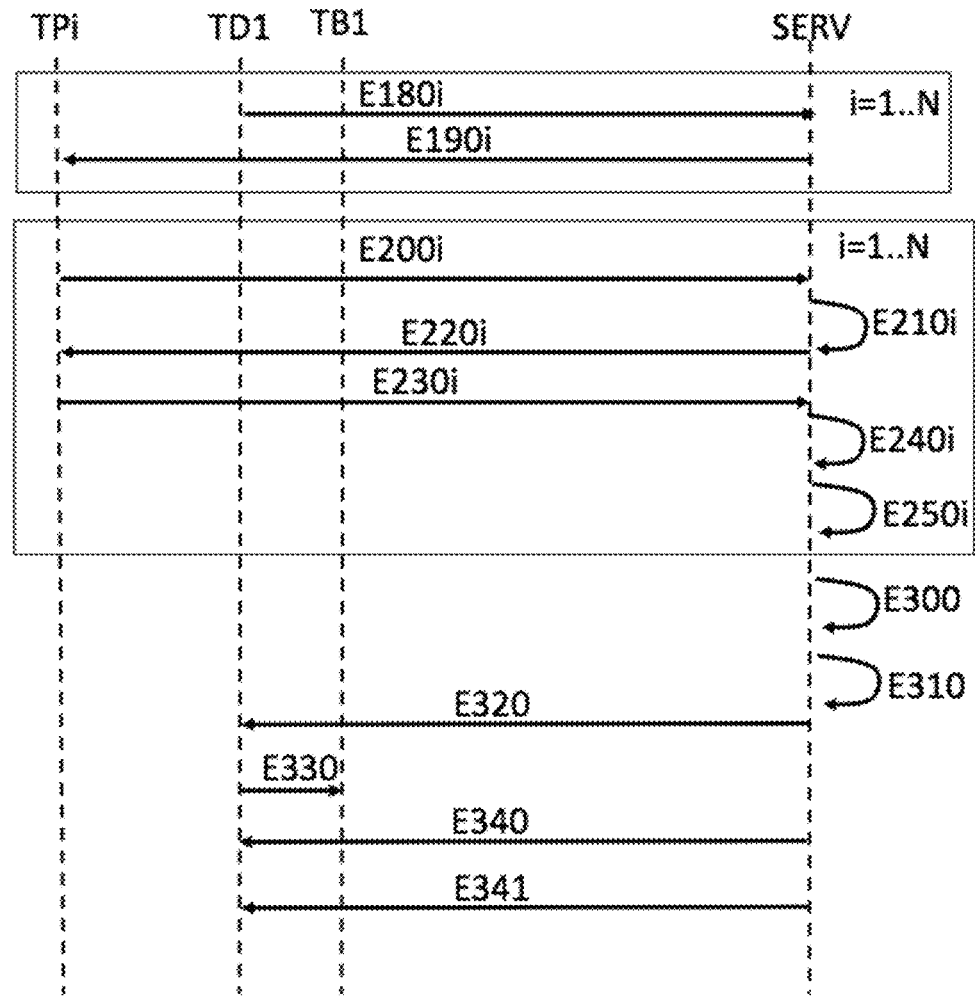
FIG. 2B illustrates steps of the method for managing access authorisation to a payment service provided to a user according to another particular embodiment of the development.

FIG. 2B illustrates steps of the method for managing access authorisation to an account of a user according to another particular embodiment of the development. According to this particular embodiment of the development, a delegated user D1 requests an access authorisation to several owner users Pi, i ranging from 1 to N. For example, a contractor (delegated user D1) asks investors (owner users Pi) to make a certain amount of money available to them to help them develop their business.

The investors accept to provide them all or part of this sum, which will not be debited from their account or even blocked, but the sum appears as virtually available in the contractor's account with the payment service provider.

Setting up authorisations on the accounts of the owner users is done in a similar way to the one described in relation to FIG. 2A.

For each owner user Pi, the following steps E180$i$ and E190$i$ are implemented.

In step E180$i$, the terminal TD1 of the delegated user D1 sends to the server SERV a request to initialise an access authorisation to the account of the owner user Pi, the request comprising the identifier of the delegated user D1, the identifier of the owner user Pi and a payment transaction amount.

In step E190$i$, the server SERV sends a message to the terminal of the owner user Pi, informing the owner user Pi of the request sent by the delegated user D1, indicating the identifier of the delegated user D1 and the payment transaction amount.

If the owner user Pi accepts the access authorisation request to their account, steps E200$i$, E210$i$, E220$i$, E230$i$, E240$i$, and E250$i$ are performed. These steps are identical to steps E200, E210, E220, E230, E240, and E250 described in relation to FIG. 2A.

In a step E300, the server SERV creates an aggregated account for the delegated user D1 from the aliases generated from each owner user Pi, and the associated temporary confidential codes. This aggregated account then comprises a new alias corresponding to the concatenation of the aliases of each owner user Pi and a provisional secret code generated from the associated temporary confidential codes. This aggregated account also comprises a concatenation of key indexes and distribution rules for executing a payment via the aggregated account.

In a step E310, the server stores the temporary data of the aggregated account for each type of delegation requested by the delegated user D1.

For example, in the particular embodiment described here, an inquiry authorisation and a payment authorisation have been requested. The server SERV therefore initiates both types of authorisations with the temporary data of the aggregated account.

Then, the server SERV broadcasts the temporary data.

For an inquiry authorisation, in a step E320, the server SERV transmits a concatenation of the new alias and the provisional secret code of the aggregated account to the terminal of the delegated user D1. The terminal of the delegated user D1 transmits this data, in a step E330, to the recipient user B1, via the network RES or any other suitable network.

For a payment authorisation, in a step E340, the server SERV transmits the new alias of the aggregated account to the terminal of delegated user D1. It then transmits, in a step E341, via a secure means, the provisional secret code of the aggregated account to the terminal of the delegated user D1.

Figure 3B:
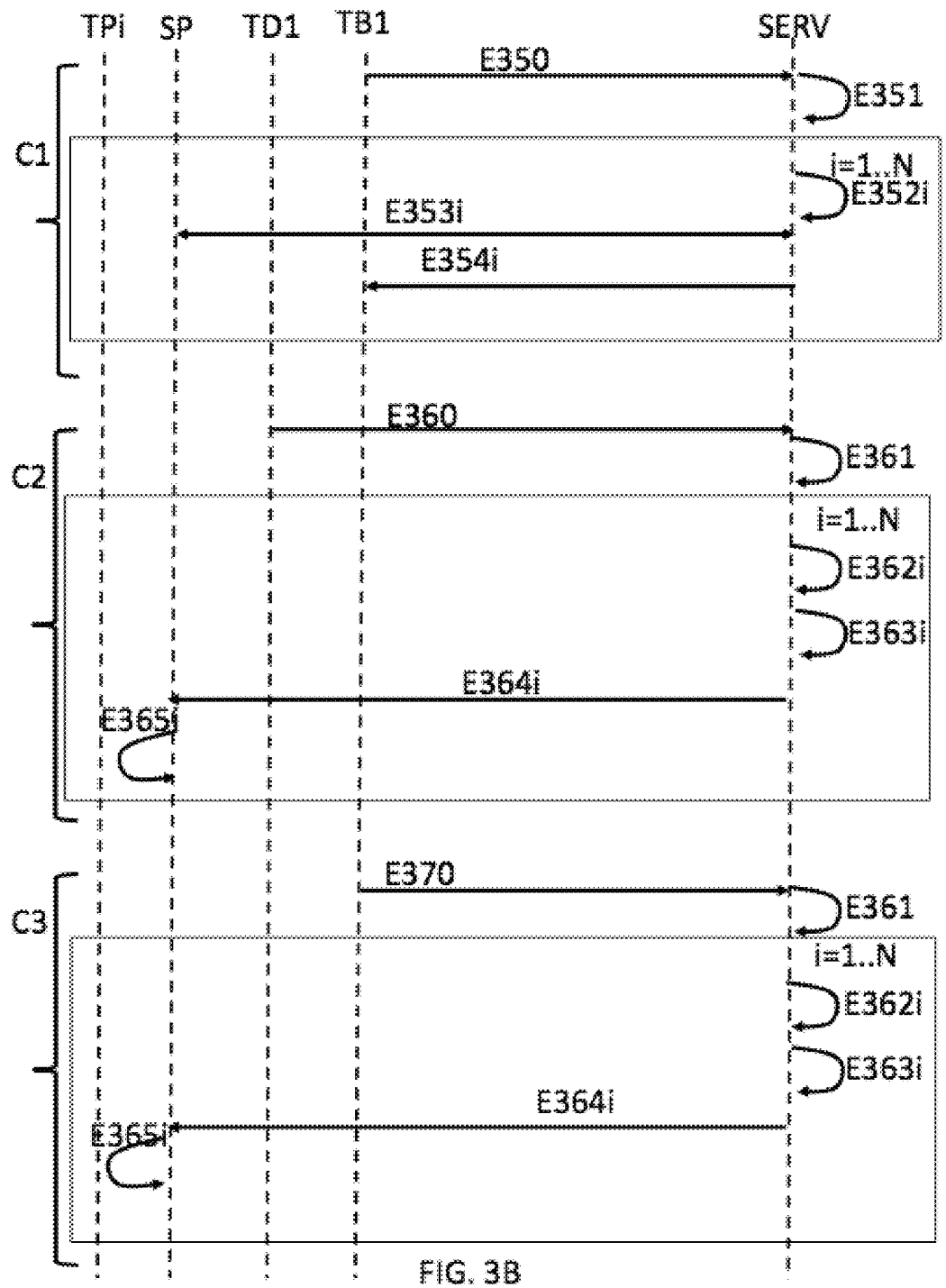
FIG. 3B illustrates other steps of the method for managing access authorisation to a payment service provided to a user according to another particular embodiment of the development.

The steps for using the access authorisations set up in the embodiment described in relation to FIG. 2B are now described in relation to FIG. 3B. Here, two uses are possible: deposit or security deposit and cash reserve.

For the deposit or security deposit, upon request of a service provider (recipient user B1), the contractor (delegated user D1) will provide a guarantee on the basis of the deposit for the supply/use of a good or service. For this purpose, in the initialisation phase described in relation to FIG. 3A, the service provider receives a debit authorisation code (alias and provisional secret code) on the aggregated account that allows them to check the status of the guarantor accounts or to execute a payment according to the expected conditions.

For the cash reserve, the contractor uses the company's account for their activity and if they exceed the limit available on their own account, they have the possibility to use the cash reserve made available by the guarantors (owner users Pi). The system then distributes the request to use the reserve to one or more guarantors.

If one guarantor refuses, the requested amount is divided among the other guarantors. If one guarantor account is underfunded, the request is rejected for that account and the requested amount is distributed among the other guarantors. If all guarantors agree, the money is transferred directly from the guarantors' accounts to the recipient's account. The money is not paid directly to the contractor's account.

The steps implemented in these two use cases are described below.

According to a first example C1, the recipient B1 wishes to check the balance of the aggregated account. For this purpose, in a step E350, they transmit to the server SERV via their terminal TB1 a deposit status request, indicating the public alias and the provisional secret code that have been communicated to them. In a step E351, the server SERV extracts the key indexes used to generate the provisional confidential codes and the public identifiers of each owner user Pi from the alias and the provisional secret code.

Then, for each owner user Pi, in a step E352$i$, the server SERV decodes the identifier of the owner user Pi and their secret code, and in a step E353$i$, the server checks with a server SB of the payment service provider the balance of the owner's user Pi account. In a step E354$i$, the server SERV returns to the terminal of the recipient B1 the status of the deposit for each owner user Pi.

As a variant, the server SERV aggregates the statuses of the deposits of all queried owner users and provides the recipient user B1 with the overall status of the deposit provided by the delegated user D1, for example, by checking that the total amount available on all the accounts of the owner users is greater than or equal to the amount required in the initial request transmitted in step E350.

According to a second example C2, the delegated user D1 wishes to use their cash reserve to make a payment to the recipient user B1. For this purpose, in a step E360, the delegated user D1 transmits to the server SERV via their terminal TD1 a payment request, indicating the public alias and the provisional secret code that have been communicated to them, as well as the payment amount. In a step E361, the server SERV extracts the key indexes used to generate the provisional confidential codes and the public identifiers of each owner user Pi from the alias and the provisional secret code.

Then, for each owner user Pi, in a step E362$i$, the server SERV decodes the identifier of the owner user Pi and their secret code, and in a step E363$i$, the server checks that the conditions set for the delegation authorisation are valid. If they are, in a step E364$i$, the server SERV transmits to the server SB an order to execute the payment for a part of the amount requested by the delegated user D1. In a step E365$i$, the server SB triggers the execution of the payment from the account of the owner user Pi to the account of the recipient B1.

According to a third example C3, the recipient user B1 wishes to apply the deposit that was provided to them and request the completion of the deposit payment. For this purpose, in a step E370, the recipient user B1 transmits to the server SERV via their terminal TB1 a payment request, indicating the public alias and the provisional secret code that have been communicated to them, as well as the payment amount. The server then proceeds as in the example C2 described above.

In step E365$i$, the server SB triggers the execution of the payment from the account of the owner user Pi to the account of the recipient B1.

Figure 4:
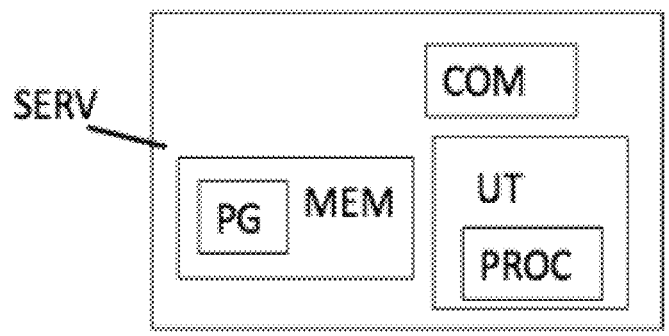
FIG. 4 illustrates an example of a management device according to a particular embodiment of the development.

FIG. 4 illustrates an example of a management device SERV according to a particular embodiment of the development. According to this particular embodiment of the development, the management device SERV has the standard architecture of a computer and notably comprises a memory MEM, a processing unit UT, equipped for example with a processor PROC, and driven by the computer program PG stored in the memory MEM. The computer program PG comprises instructions for implementing the steps of the method for managing an authorisation described above, when the program is executed by the processor PROC.

At initialisation, the code instructions of the computer program PG are for example loaded into a memory before being executed by the processor PROC. The processor PROC of the processing unit UT notably implements the steps of the method for managing an authorisation according to any one of the particular embodiments described in relation to FIGS. 2A, 2B, 3A, according to the instructions of the computer program PG.

The management device SERV also comprises a communication module COM allowing the management device to establish communications, via a communications network, for example a fixed or mobile data network.

According to a particular embodiment of the development, the management device SERV is comprised in a server, for example a server of a payment service provider.

The invention claimed is:

1. A method of managing access authorization to a payment service provided to a user, referred to as owner user, the method being implemented by a processor of a management device, the method comprising:
   receiving, from a terminal of the owner user, a first request to initialize at least one access authorization, the access authorization being intended to allow at least one delegated user to access the payment service provided to the owner user, the request comprising at least one identifier of the delegated user and one identifier of the owner user;
   sending to the terminal of the owner user a confirmation request to confirm the initialization request;
   receiving from the terminal of the owner user a confirmation message comprising a confidential code of the owner user for accessing the payment service;
   generating temporary data for accessing the payment service associated with the delegated user, the temporary data comprising a public identifier associated with the delegated user, and a confidential code associated with the public identifier,
   wherein generating the temporary data comprises:
      encoding the identifier of the owner user using an encryption key specific to the management device to form the public identifier associated with the delegated user;
      encoding the confidential code of the owner using the encryption key to form the confidential code associated with the public identifier associated with the delegated user; and
      storing the public identifier associated with the delegated user and a key index identifying the encryption key,
   wherein the used encryption key is selected from a list of available encryption keys and wherein the request further comprises an indication of an access authorization type and the public identifier is formed in a target format depending on the access authorization type;
   wherein the public identifier of the delegated user is authenticated to a payment service provider and wherein the generated confidential code is not stored by the management device; and
   transmitting the temporary data to at least one terminal of the delegated user or of another user.

2. The management method according to claim 1, comprising beforehand:
   receiving, from a terminal of the delegated user, a second request to initialize an access authorization to the payment service provided to the owner user, the request comprising the identifier of the delegated user, the identifier of the owner user and a payment transaction amount; and
   sending to the terminal of the owner user a message informing the owner of the request to initialize an access authorization sent by the terminal of the delegated user, the message comprising the identifier of the delegated user, and a payment transaction amount.

3. The management method according to claim 1, wherein when the management device receives at least one other request to initialize at least one access authorization, from a terminal of another owner user, and intended to allow the delegated user to access the payment service of the other owner user, the request comprising at least the identifier of the delegated user and one identifier of the other owner user, the method further comprises:
   storing an aggregated account comprising, for each owner user, the public identifier generated from the identifier of the owner user and associated with the delegated user, and the key index used to generate the confidential code associated with the public identifier associated with the delegated user from the confidential code of the owner user.

4. The management method according to claim 1, further comprising:
   receiving, from a terminal of a recipient user, a payment execution request comprising the public identifier associated with the delegated user, the confidential code associated with the public identifier and a payment amount;
   decoding the identifier of the owner user and the confidential code of the owner user, from the stored key index, the public identifier associated with the delegated user, and the confidential code associated with the public identifier associated with the delegated user; and
   transmitting an execution order for paying the amount to the recipient user, via the payment service provided to the owner user, based on the decoded identifier of the owner user and confidential code of the owner user.

5. A processing circuit comprising a processor and a memory, the memory storing program code instructions of a computer program for implementing the method of managing access authorization according to claim 1, when the computer program is executed by the processor.

6. A non-transitory computer-readable storage medium, comprising the computer program according to claim 5.

7. The management method according to claim 1, wherein the management device decrypts the generated confidential code as needed when executing a transaction.

8. The management method according to claim 1, wherein the management device obtains the used encryption key from the key index stored with the public identifier and the generated confidential code received from the obtained encryption key.

9. A device for managing access authorization to a payment service provided to an owner user, the device comprising a memory and a processor configured to:
   receive, from a terminal of the owner user, a request to initialize at least one access authorization, the access authorization being intended to allow at least one delegated user to access the payment service provided to the owner user, the request comprising at least one identifier of the delegated user and one identifier of the owner user;
   send to the terminal of the owner user a confirmation request to confirm the initialization request;
   receive from the terminal of the owner user a confirmation message comprising a confidential code of the owner user for accessing the digital payment service;
   generate temporary data for accessing the payment service associated with the delegated user, the temporary data comprising a public identifier associated with the delegated user, and a confidential code associated with the public identifier, wherein generating the temporary data comprises:
- encoding the identifier of the owner user using an encryption key specific to the management device to form the public identifier associated with the delegated user;
- encoding the confidential code of the owner using the encryption key to form the confidential code associated with the public identifier associated with the delegated user; and
- storing the public identifier associated with the delegated user and a key index identifying the encryption key, wherein the used encryption key is selected from a list of available encryption keys and wherein the request further comprises an indication of an access authorization type and the public identifier is formed in a target format depending on the access authorization type;

wherein the public identifier of the delegated user is authenticated to a payment service provider and wherein the generated confidential code is not stored by the management device; and transmit the temporary data to at least one terminal of the delegated user or of another user.

* * * * *